UNITED STATES PATENT OFFICE.

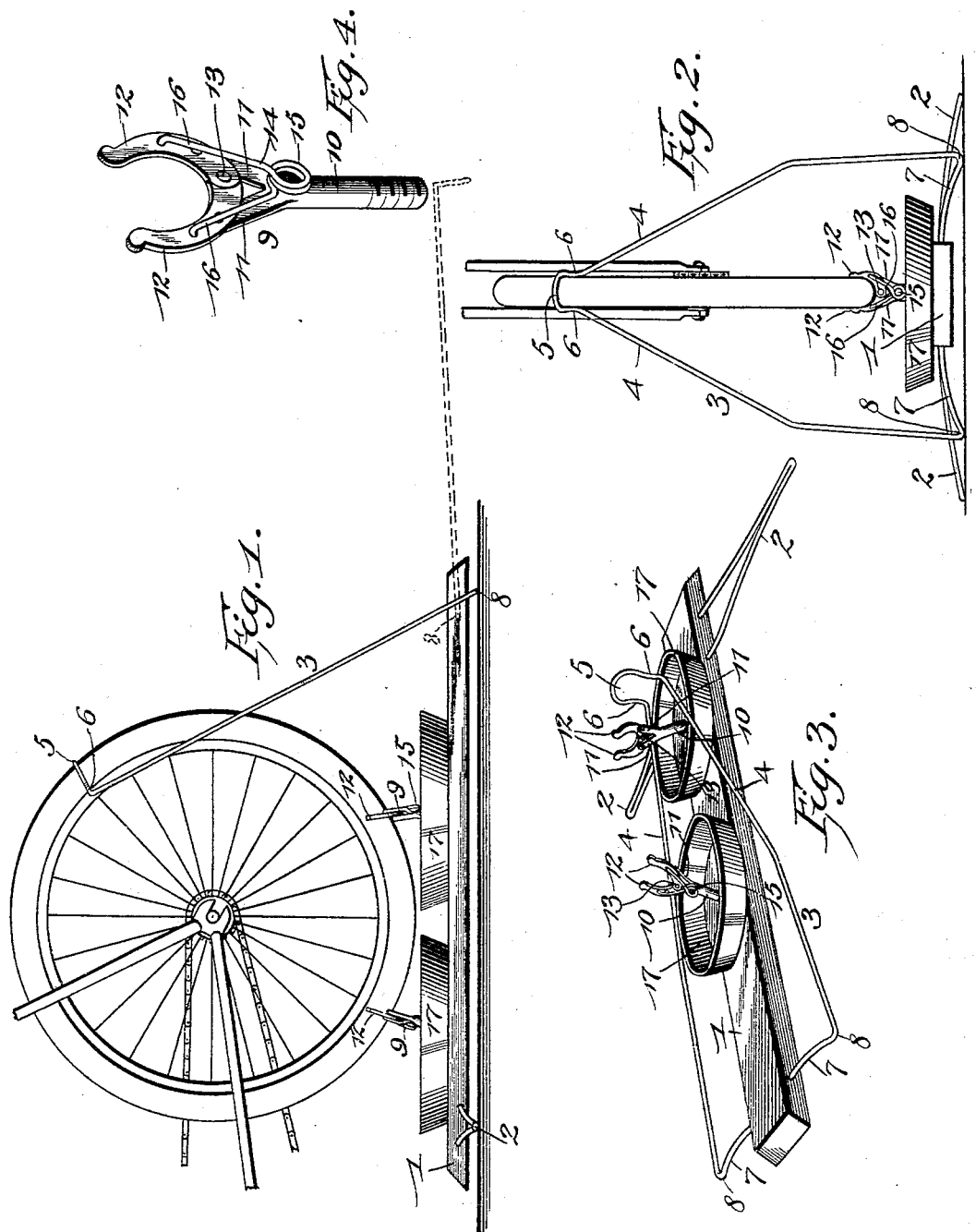

JOHN BATTEN AND ELLWOOD F. MAUL, OF FAIRTON, NEW JERSEY.

BICYCLE-SUPPORT AND TIRE-CLEANER.

SPECIFICATION forming part of Letters Patent No. 632,800, dated September 12, 1899.

Application filed April 1, 1899. Serial No. 711,348. (No model.)

*To all whom it may concern:*

Be it known that we, JOHN BATTEN and ELLWOOD F. MAUL, citizens of the United States, residing at Fairton, in the county of Cumberland and State of New Jersey, have invented a new and useful Bicycle-Support and Tire-Cleaner, of which the following is a specification.

This invention relates to bicycle-supports, and has for its object to provide a combined support and tire-cleaner, whereby the bicycle may be supported in an upright position when not in use and the tires may be effectively cleansed of all dirt and foreign matter.

To these ends the present invention consists in the combination and arrangement of parts, as will be hereinafter more fully described, shown in the accompanying drawings, and more particularly pointed out in the appended claims.

In the drawings, Figure 1 is a side elevation of the rear portion of a bicycle supported by the present invention. Fig. 2 is a rear elevation thereof. Fig. 3 is a perspective view of the device. Fig. 4 is a detail perspective view of one of the tire-cleaning devices.

Corresponding parts are designated by like reference-numerals in all the figures of the drawings.

Referring to the accompanying drawings, 1 designates the base of the device and consists of a flat board of suitable length and breadth. At the forward end thereof are transverse braces 2, extending at opposite sides of the base to prevent the latter from being accidentally turned over. A wheel-support 3 is provided at the opposite end of the base and is formed from a single rod bent intermediate of its ends, forming divergent upright legs 4, the bend between the legs being deflected into a horizontal position, forming the open wheel-engaging clamping-loop 5. It will be noted that the opposite sides of the loop, where they join the legs 4, as at 6, are deflected inward to form a contracted mouth or opening into the clamping-loop. The legs diverge downwardly, and at a point below the plane of the base they are bent inward toward the same, forming transverse braces 7, the ends of each being entered into the opposite edges of the base and forming the connection between the latter and the legs 4. The opposite bends 8 between the legs and the braces 7 are alined transversely below the plane of the under side of the base and form feet which are adapted to rest upon the floor or other surface at opposite sides of the base and form a substantial brace for the device.

To support a bicycle upon the device, one of the wheels, preferably the rear one, is run upon the base from the front end until the tire and rim of the wheel is entered through the opening or mouth of and into the clamping-loop 5, as illustrated in Fig. 1. The length of the legs 4 is such as to locate the clamping-loop above the horizontal axis of the wheel, whereby the bicycle is firmly held in an upright position for display or to hold the same when not in use.

It will be observed that the device occupies very little more room than the bicycle itself, and when not in use the wheel-clamp 3 may be folded forwardly upon the base, as indicated in Fig. 3, and the support may be stored away in a comparatively small space.

The device is also adapted for cleaning the tires and rims of a bicycle by means of clamps 9, forming cleaning devices, one of which is illustrated in detail in Fig. 4. Said devices are duplicates in construction and each comprises a threaded stem 10, which is adapted to be screwed into the upper face of the base 1 and removably secure the cleaning device thereto. The upper end of the stem is provided with divergent arms 11, to which are pivoted the opposite jaws 12, respectively. Each jaw is of arcuate form, being pivoted intermediate of its ends, and the contiguous lower ends of the jaws are pivoted together, as at 13, between the divergent arms 11. These jaws are yieldingly held in their normal position by means of a spring 14, which is formed from a single length of spring-wire twisted into a spring-coil 15 intermediate of its ends and having opposite divergent arms 16 connected to the respective jaws above the pivots 13 thereof. These cleaning devices are alined longitudinally of the base and in the same vertical plane with the wheel-clamp, so that the wheel may be held by both when supported by the device. Each stem 10 projects centrally from a flanged plate or receptacle 17, which is adapted to receive the dirt cleaned from the wheels.

In the operation of the cleaning devices the wheel-support 3 is folded outward from the base, as indicated in dotted lines in Fig. 1, and the tire of the wheel is run in between the jaws of the cleaners, which fit the tire exactly by reason of the springs tending to force the jaws together. The bicycle is steadied by one hand, and with the other the wheel is turned, and by reason of the frictional engagement between the jaws and the tire the latter is scraped clean of all dirt, which falls into the receptacles 17. When the first wheel has been cleaned, the same is run out of the cleaners and the other wheel placed therein and the operation repeated.

It will be noted that the cleaning devices are inclined toward each other to provide a drawing scraping action upon the tire. The receptacles receive all the dirt that is scraped from the tires and prevent the same from soiling the floor.

It will be understood that the wheel-clamp 3 engages the wheel above its horizontal axis to support the bicycle against lateral movement, and the cleaning devices also engage the wheel and prevent the same from turning, whereby the wheel-clamp and the cleaning devices coact to support the bicycle in a positive and effective manner.

By reference to Fig. 1 it will be noted that the wheel-support 3 is thrown well forward, so that the looped clamp 5 engages the tire of the wheel in advance of the feet 8 of the support 3, and as the base does not rest upon the floor the weight of the bicycle tends to force the support against the wheel, whereby the former is more positively engaged with the latter and the support is prevented from accidentally folding outward and away from the wheel.

Changes in the form, proportion, size, and the minor details of construction within the scope of the appended claims may be resorted to without departing from the spirit or sacrificing any of the advantages of the present invention.

Having thus described the invention, what is claimed is—

1. In a device of the class described, the combination with a base, of a dirt-receiving receptacle supported upon the base, and longitudinally-alined clamps located within the dirt-receptacle and projecting above the upper face of the base, each clamp being provided with jaws having a movement transversely of the base, and adapted to embrace the tire of a wheel, substantially as and for the purpose set forth.

2. In a device of the class described, the combination with a base, of a dirt-receptacle provided upon the upper face thereof, and a pair of longitudinally-alined clamps located within the dirt-receptacle and projecting above the upper face of the base, each clamp comprising a stem having divergent arms, opposite arcuate jaws pivoted intermediate of their ends to the respective divergent arms, and having their lower ends pivoted or hinged together, and a spring yieldingly connecting the jaws, substantially as and for the purpose set forth.

3. In a device of the class described, the combination with a flat base, of a dirt-receptacle provided upon the upper face of the base, a pair of longitudinally-alined clamps located within the dirt-receptacle and projecting above the upper face of the base, each clamp being provided with jaws having a movement transversely of the base, and a wheel-support hinged or pivoted to one end of the base and extending upwardly therefrom, the upper end of the support being provided with means to engage the wheel of the bicycle, substantially as shown and described.

In testimony that we claim the foregoing as our own we have hereto affixed our signatures in the presence of two witnesses.

JOHN BATTEN.
ELLWOOD F. MAUL.

Witnesses:
WINFIELD S. BETCHEW,
AARON SMITH.